US010205228B2

(12) United States Patent
Bernus et al.

(10) Patent No.: US 10,205,228 B2
(45) Date of Patent: Feb. 12, 2019

(54) SYSTEM FOR EMITTING AND/OR RECEIVING ELECTROMAGNETIC WAVES EMBEDDED IN AN AIRCRAFT

(71) Applicant: AIRBUS OPERATIONS (SAS), Toulouse (FR)

(72) Inventors: Christophe Bernus, Toulouse (FR); Jean Redon, Toulouse (FR); Nathalie Esteve, Leguevin (FR); Cécile Poret, La Salvetat Saint Gilles (FR); Andrei Bulancea, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 2 days.

(21) Appl. No.: 15/667,783

(22) Filed: Aug. 3, 2017

(65) Prior Publication Data

US 2018/0040945 A1    Feb. 8, 2018

(30) Foreign Application Priority Data

Aug. 3, 2016   (FR) ...................... 16 57526

(51) Int. Cl.
*H02H 1/00* (2006.01)
*H01Q 1/28* (2006.01)
(Continued)

(52) U.S. Cl.
CPC ........... *H01Q 1/281* (2013.01); *G01F 23/284* (2013.01); *H01Q 1/286* (2013.01); *H01Q 1/405* (2013.01);
(Continued)

(58) Field of Classification Search
CPC ........ H01Q 1/281; H01Q 1/286; H01Q 1/405; H01Q 1/422; H01Q 1/425; H01Q 1/44;
(Continued)

(56) References Cited

U.S. PATENT DOCUMENTS 4,010,470 A    3/1977   Jones, Jr.
5,661,262 A *  8/1997   Wilk ........................ H01T 4/14
                                                              174/2

(Continued)

FOREIGN PATENT DOCUMENTS

EP    2 782 190    9/2014
FR    2 924 686    6/2009
WO    WO 91/20107  12/1991

OTHER PUBLICATIONS

FR Search Report cited in French Application No. 1657526, dated Apr. 7, 2017, 2 pages.

*Primary Examiner* — Lam T Mai
(74) *Attorney, Agent, or Firm* — Nixon & Vanderhye P.C.

(57) ABSTRACT

A system for emitting and/or receiving electromagnetic waves embedded in an aircraft, the aircraft including an emitting and/or receiving device for emitting and/or receiving electrical signals, a radome having an electrically insulating protective envelope (12), on which at least one lightning arrester strip (21) is arranged, the radome being attached to a metal frame of the aircraft (30), a first part of the at least one lightning arrester strip is electrically connected to the metal frame of the aircraft, a second part of the at least one lightning arrester strip is connected to the emitting and/or receiving device via a metal element (35) of a predetermined shape, the at least one lightning arrester strip forming an antenna and a part of the metal element (35) is placed at a predetermined distance (d) from a part of the metal frame of the aircraft (30) for forming a capacitive link between the metal element and the metal frame of the aircraft.

14 Claims, 3 Drawing Sheets

(51) Int. Cl.
*G01F 23/284* (2006.01)
*H01Q 1/40* (2006.01)
*H01Q 1/42* (2006.01)
*H01Q 21/29* (2006.01)
*H01Q 1/44* (2006.01)
*H01Q 1/50* (2006.01)

(52) U.S. Cl.
CPC ............. *H01Q 1/422* (2013.01); *H01Q 1/425* (2013.01); *H01Q 1/44* (2013.01); *H01Q 1/50* (2013.01); *H01Q 21/29* (2013.01)

(58) Field of Classification Search
CPC ........ H01Q 1/50; H01Q 21/29; B29C 70/386; B29C 70/885; G01F 23/284
USPC ............................ 361/111–118; 343/708, 872
See application file for complete search history.

(56) References Cited

U.S. PATENT DOCUMENTS

| | | | | |
|---|---|---|---|---|
| 5,678,171 A | * | 10/1997 | Toyama | H01Q 1/28 725/76 |
| 5,812,083 A | * | 9/1998 | Johnson | G01S 7/021 342/13 |
| 7,511,672 B2 | * | 3/2009 | Su | H01Q 9/14 343/702 |
| 8,228,248 B1 | * | 7/2012 | Kahle | H01Q 1/44 343/705 |
| 8,354,968 B1 | * | 1/2013 | Paulsen | H01Q 1/48 343/700 MS |
| 2008/0169987 A1 | * | 7/2008 | McNutt | H01Q 1/28 343/705 |
| 2011/0056718 A1 | * | 3/2011 | Gattus | B64D 45/02 174/2 |

* cited by examiner

SYSTEM FOR EMITTING AND/OR RECEIVING ELECTROMAGNETIC WAVES EMBEDDED IN AN AIRCRAFT

RELATED APPLICATION

This application claims priority to and incorporates by reference French Patent Application 1657526 filed Aug. 3, 2016.

TECHNICAL FIELD

The present invention relates to a system for emitting and/or receiving electromagnetic waves embedded in an aircraft.

BACKGROUND

It is known that aircraft, when they cross a storm area, may suffer lightning impacts. These lightning impacts are especially localized at the extremities of the aircraft. Thus, the radome of the aircraft constitutes a risk area. Lightning is liable to cause significant damage to the radome and equipment within the radome. The radome forms a protective envelope, transparent to electromagnetic waves, for very expensive electronic hardware such as radar and counter-measures. The radome is attached to the metal frame of the aircraft.

For protecting the radome or other parts of the aircraft, it is known to place lightning arrester strips on the outer surface of the radome or other surface of the aircraft to be protected from lighting strikes. These strips are typically placed on surfaces where impacts of the lightning striking are predicted. The strips are part of a conductive path that routes strong discharge currents from the point of lighting impact on the strip to an electrical ground in the aircraft, such as the metal frame of the aircraft. The lightning arrester strips should, in addition, be transparent to electromagnetic waves and interfere, as little as possible, with the transmission of waves through the wall of the radome.

Various types of lightning arrester strips have been used. For example, solid metal strips are known to convey the energy of a lightning arc by conduction of the current in their thickness to the metal frame of the aircraft.

Strips are also known which consist of a thin dielectric substrate on the exposed surface of which, conductive metal segments or patches are attached, aligned and spaced apart. The current induced by a lightning arc is routed by successive leaps, from segment to segment, by local ionization of the air above the segments.

Usually, electromagnetic wave emitting and/or receiving antennas are arranged in the radome.

The coexistence of lightning arrester strips and antennas in the radome may sometimes interfere with the emission and/or transmission quality of electromagnetic signals by the antennas.

SUMMARY

A system has been invented and is disclosed herein for emitting and/or receiving electromagnetic waves of an aircraft which allows the use of a lightning arrester strip as an emitting and/or receiving antenna. The system addresses at least some of the drawbacks described above with respect to the prior art, such by minimizing interference caused by lighting arrester strips to the emission and/or transmission quality of electromagnetic signals through antennas of an aircraft.

A first embodiment of the invention is an aircraft including a system for emitting and/or receiving electromagnetic waves embedded in an aircraft, wherein the aircraft includes an emitting and/or receiving device for emitting and/or receiving electrical signals; a radome forming an electrically insulating protective envelope, on which at least one lightning arrester strip is arranged, the radome being attached to a metal frame of the aircraft; a first part of the at least one lightning arrester strip being electrically connected to the metal frame of the aircraft; a second part of the at least one lightning arrester strip is connected to the emitting and/or receiving device via a metal element having a predetermined shape, wherein the at least one lightning arrester strip forms an antenna and a part of the metal element is placed at a predetermined distance from a part of the metal frame of the aircraft for forming a capacitive link between the metal element and the metal frame of the aircraft. Due to this configuration of the at least one lighting arrester strip and its capacitive link, the lightning arrester strip is operable as an emitting and/or receiving antenna.

The at least one lightning arrester strip may include a solid metal strip the length of which is a submultiple of the wavelength of the electrical signals.

The solid metal strip may be extended by a strip having a thin dielectric substrate on which aligned and spaced apart conductive metal segments or patches are arranged.

Further, at least two of the lightning arrester strips may be arranged on the radome such that the two lightning arrester strips are connected to the emitting and/or receiving device via two metal elements of predetermined shape. The electrical signals transmitted to one of the two lightning arrester strips are phase-shifted by 180 degrees from the electrical signals transmitted to the other lightning arrester strip.

The predetermined shape of the metal elements may be an L-shape.

The protective envelope may be transparent to electromagnetic waves. Further, the protective envelope is a composite structure composed of two layers of fibreglass, a sheet of honeycomb and two further layers of fibreglass.

The present invention also relates to an aircraft that comprises a system for emitting and/or receiving electromagnetic waves according to the present invention. The term aircraft includes winged aircraft, helicopters, flying drones, rockets, dirigibles and other flying devices.

BRIEF DESCRIPTION OF THE DRAWINGS

The features of the invention mentioned above, as well as others, will appear more clearly on reading the following description of an embodiment, said description being made in relation to the attached drawings, in which.

DETAILED DISCLOSURE OF EMBODIMENTS

Figure 1:
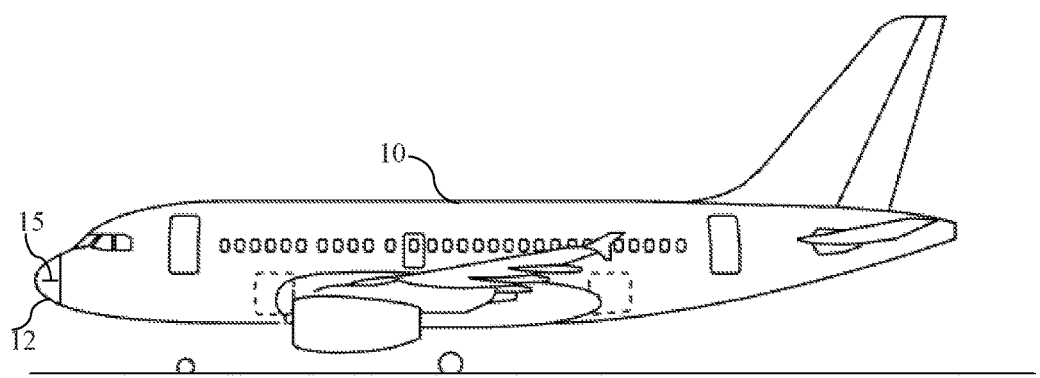
FIG. 1 represents an aircraft comprising a system for emitting and/or receiving electromagnetic waves according to an embodiment of the invention.

FIG. 1 represents an aircraft comprising a system for emitting and/or receiving electromagnetic waves according to an embodiment of the invention.

The aircraft 10 comprises a radome 12 on which at least one lightning arrester strip 15 is arranged. Similar lighting arrester strips 15 may be positioned on the outer surface of the radome, or other outer surfaces of the aircraft, including at positions where lighting strikes are considered likely or predicted. For example, six lightning arrester strips are arranged on the radome.

The radome 12 includes an electrically insulating protective envelope transparent to electromagnetic waves. The protective envelope formed by the radome is, for example, a composite structure composed of two layers of fibreglass, a sheet of honeycomb and a further two layers of fibreglass. The radome material may have a relative permittivity of at least 3.3. The radome 12 protects electronic equipment such as radar or counter-measures. The radome may be attached to the metal frame of the aircraft.

The aircraft 10 includes a system for emitting and/or receiving electromagnetic waves of an aircraft, comprising a lightning arrester strip 15, a first part of the at least one lightning arrester strip 15 is electrically connected to the metal frame of the aircraft 10, a second part of the at least one lightning arrester strip 15 is connected to the emitting and/or receiving device for emitting and/or receiving electrical signals via a metal element of a predetermined shape, the at least one lightning arrester strip forming an antenna and a part of the metal element is placed at a predetermined distance from a part of the metal frame of the aircraft for forming a capacitive link between the metal element and the metal frame of the aircraft.

Figure 2:
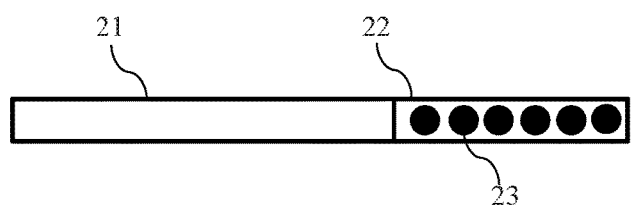
FIG. 2 represents an example of a lightning arrester according to an embodiment of the invention.

FIG. 2 represents an example of a lightning arrester strip according to an embodiment of the invention.

The lightning arrester strip 15 includes of a metal strip 21. The metal strip 21 is, for example, made of copper, has a rectangular cross section of a width of 10 mm and a thickness of 2 mm.

The metal strip 21 has a length that is a submultiple of the wavelength of the electrical signals to be emitted or received by the lighting arrester strip 15. For example, the metal strip 21 has a length that is equal to a quarter of the wavelength of the electrical signals. The electrical signals have, for example, a carrier frequency between 108 MHz and 118 MHz.

If the length of the metal strip 21 does not correspond to a desired length for ensuring good protection with regard to lightning impacts, the metal strip may be extended by another part 22 the structure of which is different from the metal strip 21.

The another part 22 may be a strip including a thin dielectric substrate on which is aligned and spaced apart conductive metal segments 23 or patches. For example, the dielectric substrate is a glass laminate, the metal patches have a diameter of 3 mm, a thickness of 0.2 mm and are spaced 0.2 mm apart.

Figure 3:
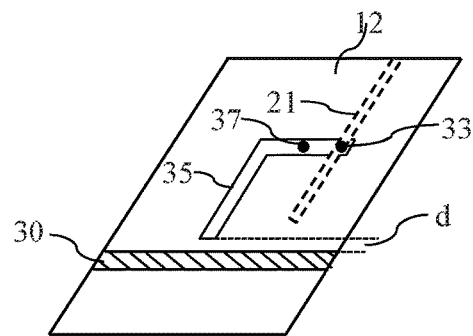
FIG. 3 represents an example of positioning of a metal element with a lightning arrester strip and an element of the metal frame of the aircraft according to an embodiment of the invention.

FIG. 3 represents an example of positioning of a metal element 21 with a lightning arrester strip and an element of the metal frame of the aircraft according to an embodiment of the invention.

The metal element 35 has a predetermined shape, such as an L-shape as shown in the example of FIG. 3. The base of the L-shaped metal element 35 is placed opposite a part 30 of the metal frame on which the radome 12 is attached thus forming a capacitance between the metal element 35 and the metal frame 30.

For example, the distance d separating the base of the metal element 35 and the part 30 of the metal frame is 1 mm.

An emitting and/or receiving device for emitting and/or receiving electrical signals not represented in FIG. 3 is connected to the metal element 35 by a connection denoted by 37.

An electrical link 33 is between the metal element 33 and the metal strip 21. The metal strip 21 may be on an outer surface of the radome and the metal element 35 may be on an inner surface, wherein the electrical link 33 is a metal connection extending through the protective envelope of the radome to connect the metal element and metal strip. The electrical link 33 may be at a point along the length of the metal strip 21, such as at a mid-point. The metal strip 21 may extend a length in either or both directions from the electrical link 33 that is a submultiple, e.g., one-half, of a wavelength of a carrier frequency transmitted or received by the emitting and/or receiving device.

Figure 4:
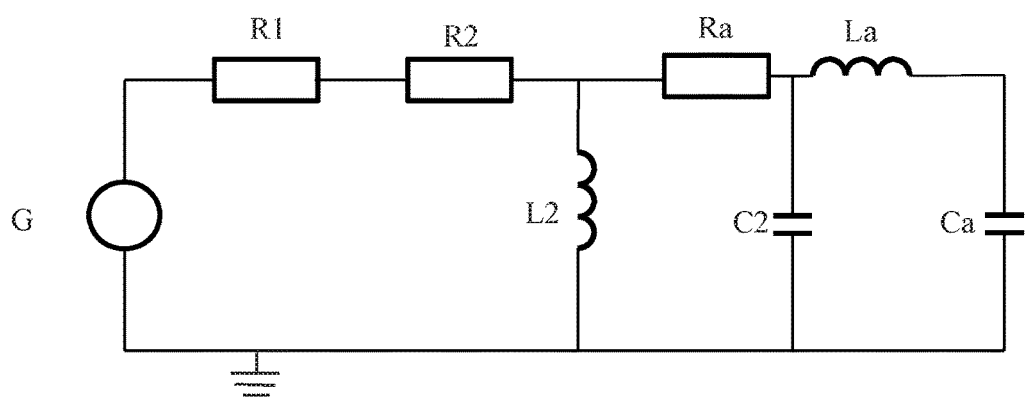
FIG. 4 represents an equivalent electrical diagram of the system for emitting and/or receiving electromagnetic waves according to an embodiment of the invention.

FIG. 4 represents an equivalent electrical diagram of the system for emitting and/or receiving electromagnetic waves according to an embodiment of the invention.

An emitting and/or receiving device G for emitting and/or receiving electrical signals is grounded by the metal frame of the aircraft. The emitting and/or receiving device may be one or more of a transceiver, transmitter and receiver. A terminal of the device G is electrically coupled to the metal strip 22 through a conductive path. The resistance R1 represents the impedance of the emitting and/or receiving device G for emitting and/or receiving electrical signals. For example, the resistance R1 has a value of 100 ohms.

The conductive path is coupled to the antenna formed by metal strip 21. The conductive path between the device G and the metal strip 21 has a resistance R2 which represent in-line losses.

Inductance L2 represents inductance associated with the conductive path between the emitting and/or receiving device G and the antenna formed by the metal band 21. Inductance L2 is with respect to the ground, e.g., metal frame of the aircraft.

Capacitor C2 represents a capacitive link between the base of the metal element 35 and the metal frame 30. C2 includes the dielectric material of the radome material between the metal element 35 and the metal frame. The capacitance C2 depends on the distance d across the radome separating the base of the metal element 35 from the metal frame 30.

Resistance Ra represents radiation resistance of the antenna formed by the metal strip 21. Inductance La represents the inductance of the antenna formed by the metal strip 21.

The resistance Ra, inductance La and capacitance Ca represent the antenna formed by the metal strip 21.

The value of the capacitor C2 is selected so that at the resonance frequency of the antenna formed by the metal strip 21, the impedances of the capacitor C2 and the inductance L2 cancel out.

Figure 5:
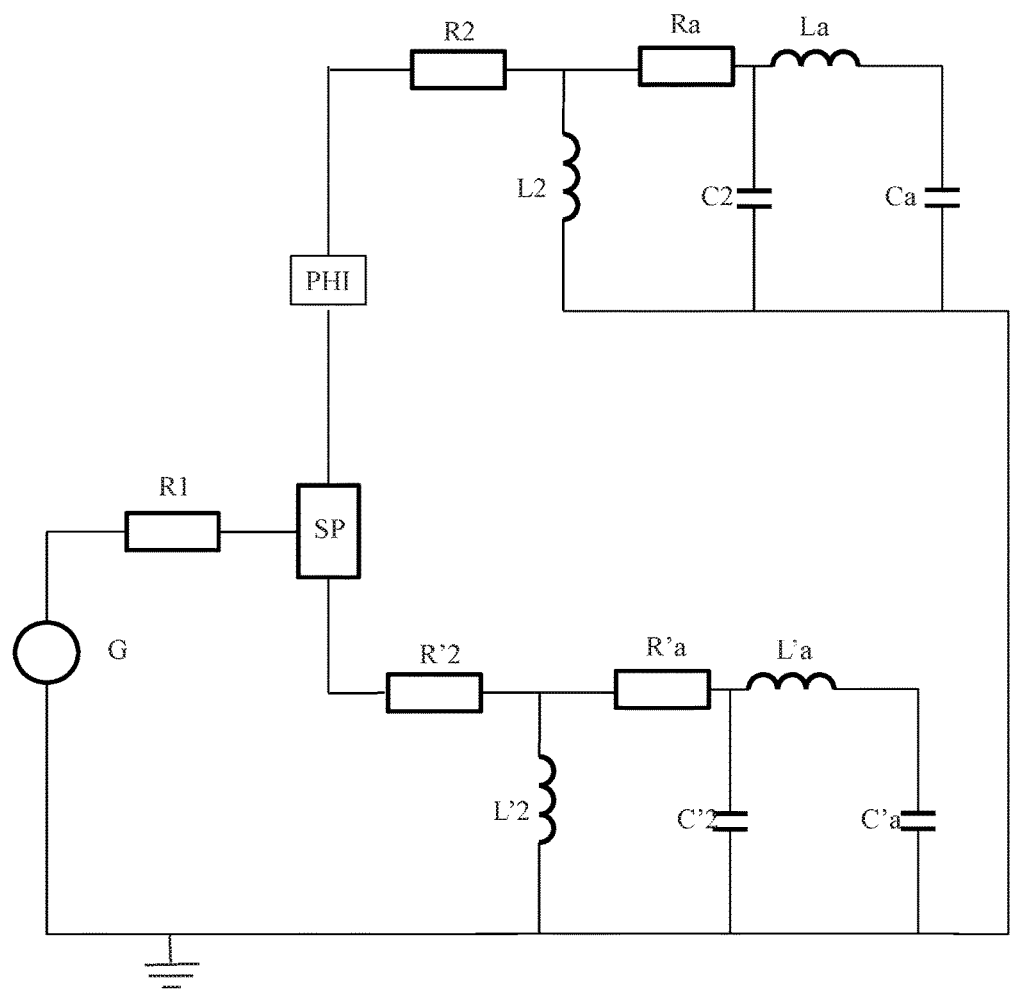
FIG. 5 represents an equivalent electrical diagram of the system for emitting and/or receiving electromagnetic waves according to an embodiment of the invention in which two antennas are used.

FIG. 5 represents an equivalent electrical diagram of the system for emitting and/or receiving electromagnetic waves according to an embodiment of the invention in which two antennas are used.

In the example of FIG. 5, the emitting and/or receiving device G for emitting and/or receiving electrical signals is grounded by the metal frame of the aircraft. The resistance R1 represents an output impedance of the emitting and/or receiving device G. for emitting and/or receiving electrical signals. For example, the resistance R1 has a value of 100 ohms.

The conductive path including resistance R1 is connected to a coupler SP which delivers the same electrical signal to two antennas. These two antennas are formed by metal strips 21 of two lightning arrester strips 15 on a radome. One of the outputs of the coupler SP is phase-shifted by 180 degrees by a phase-shifting device PHI. The PHI may be formed by a length of a conductive path between the coupler SP and the antenna symbolized by Ra, Ca, and La that has a distance a half wavelength (or multiple thereof) greater or less than the length of link between the coupler SP and the second antenna symbolized by R'a, C'a and L'a.

The value of the capacitor C2 is determined so that at a resonance frequency of the antenna formed by a first metal strip, the impedances of the capacitor C2 and the inductance L2 cancel out.

The value of the capacitor C'2 is determined so that at a resonance frequency of the antenna formed by a second metal strip, the impedances of the capacitor C'2 and the inductance L'2 cancel out.

The invention may be embodied as an aircraft comprising a system for emitting and/or receiving electromagnetic waves, said system comprising an emitting and/or receiving device for emitting and/or receiving electrical signals, a radome consisting of an electrically insulating protective envelope (12) on which at least one lightning arrester strip (21) is arranged, the radome being attached to a metal frame of the aircraft (30), a first part of the at least one lightning arrester strip being electrically connected to the metal frame of the aircraft, wherein a second part of the at least one lightning arrester strip is connected to the emitting and/or receiving device via a metal element (35) of a predetermined shape, the at least one lightning arrester strip forming an antenna and wherein a part of the metal element (35) is placed at a predetermined distance (d) from a part of the metal frame of the aircraft (30) for forming a capacitive link between the metal element and the metal frame of the aircraft.

The at least one lightning arrester strip may consist of a solid metal strip the length of which is a submultiple of the wavelength of the electrical signals. The solid metal strip may be extended by a strip consisting of a thin dielectric substrate on which aligned and spaced apart conductive metal segments or patches are arranged.

There may be at least two lightning arrester strips are arranged on the radome and wherein two lightning arrester strips are connected to the emitting and/or receiving device via two metal elements of predetermined shape, the electrical signals transmitted to a lightning arrester strip are phase-shifted by 180 degrees from the electrical signals transmitted to the other lightning arrester strip. The predetermined shape may be an L-shape. The protective envelope may be transparent to electromagnetic waves. The protective envelope may be a composite structure composed of two layers of fibreglass, a sheet of honeycomb and two further layers of fibreglass.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft including a system for emitting and/or receiving electromagnetic waves, said system comprising:
    an emitting and/or receiving device for emitting and/or receiving electrical signals;
    a radome having an electrically insulating protective envelope, wherein the radome is attached to a metal frame of the aircraft, and
    at least one lightning arrester strip is arranged on the radome, wherein a first part of the at least one lightning arrester strip is electrically connected to the metal frame of the aircraft, and a second part of the at least one lightning arrester strip is connected to the emitting and/or receiving device via a metal element of a predetermined shape,
    wherein the at least one lightning arrester strip forms an antenna and a part of the metal element is placed at a predetermined distance (d) from a part of the metal frame of the aircraft to establish a capacitive link between the metal element and the metal frame.

2. The aircraft according to claim 1, wherein the at least one lightning arrester strip includes a solid metal strip having a length which is a submultiple of a wavelength of the electrical signals.

3. The aircraft according to claim 2, wherein the solid metal strip is extended by another strip formed of a thin dielectric substrate on which is arranged aligned and spaced apart conductive metal segments or patches.

4. The aircraft according to claim 1, wherein the at least one lightning arrester strip includes two lighting arrester strips arranged on the radome and wherein one of the two lightning arrester strips is connected to the emitting and/or receiving device each via the metal element of predetermined shape and a first conductive path, and the other of the two lighting arrester strips is connected via another metal element of predetermined shape and a second conductive path to the emitting and/or receiving device, wherein the first and second conductive paths differ in length by an integer multiple of a half of a wavelength of the electrical signals.

5. The aircraft according to claim 1, wherein the predetermined shape is an L-shape.

6. The aircraft according to claim 1, wherein the protective envelope is transparent to electromagnetic waves.

7. The aircraft according to claim 1, wherein the protective envelope is a composite structure composed of two layers of fibreglass, a sheet of honeycomb and two further layers of fibreglass.

8. A system for emitting and/or receiving electromagnetic waves configured for an aircraft, said system comprising:
    an emitting and/or receiving device configured to emit and/or receiving electrical signals;
    a lightning arrester strip on an outer surface of an aircraft, wherein the lighting arrester strip is configured as an antenna to transmit and/or receive the electrical signals;
    a first part of the lightning arrester strip is electrically connected to a metal frame of the aircraft, a metal element on the outer surface of the aircraft, the metal element is connected to a second part of the lightning arrester strip and is electrically coupled to the emitting and/or receiving device, and a capacitive link between the metal element and the metal frame is formed across a dielectric gap formed by a predetermined distance (d) between the metal frame and the metal element.

9. The system of claim 8 wherein the capacitive link has an impedance which is substantially equal to an inductance of the lighting arrester strip at a carrier wavelength of the electrical signals.

10. The system of claim 8 wherein the metal element has an L-shape and an end of the base of the L-shape the predetermined distance (d) from the metal frame and an end of a leg of the L-shape is connected to the lighting arrester strip.

11. The system of claim 8 wherein the lighting arrester strip has a length which is a submultiple of a carrier wavelength of the electrical signals.

12. The system of claim 8 wherein the lighting arrester strip includes an metal strip and another strip, wherein the metal strip forms the antenna and the another strip includes a dielectric substrate and conductive metal elements arranged on the dielectric substrate, wherein the conductive metal elements are spaced apart from each other on the dielectric substrate.

13. The system of claim 8 wherein the outer surface is a surface of a radome of the aircraft.

14. The system of claim 8 further comprising:

another lightning arrester strip on the outer surface of an aircraft configured as an antenna to transmit and/or receive the electrical signals;

a first part of the another lightning arrester strip is electrically connected to the metal frame of the aircraft, another metal element on the outer surface of the aircraft, the metal element is connected to a second part of the another lightning arrester strip and is electrically coupled to the emitting and/or receiving device, another capacitive link between the another metal element and the metal frame is formed across a dielectric gap formed by a predetermined distance between the metal frame and the another metal element;

a first conductive path between the emitting and/or receiving device and the metal element; and another conductive path between the emitting and/or receiving device and the another metal element, wherein a length of the another conductive path differs from a length of the first conductive path by an integer multiple of a half of a carrier wavelength of the electrical signals.

\* \* \* \* \*